Aug. 15, 1961  R. DAUB  2,996,342
PISTON HEAD STRUCTURE
Filed Feb. 18, 1957
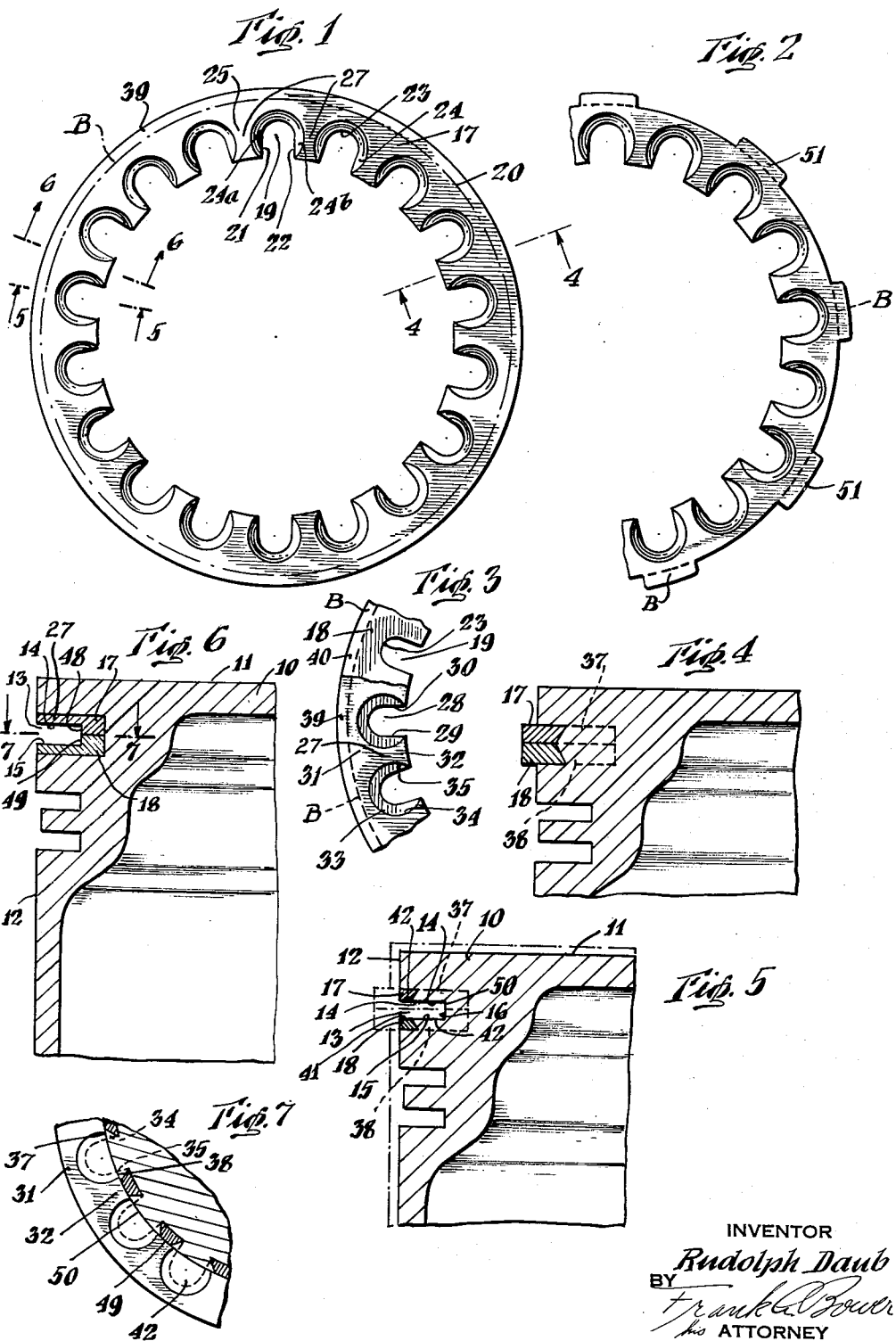
INVENTOR
Rudolph Daub
BY
Frank G. Bower
his ATTORNEY

United States Patent Office 2,996,342
Patented Aug. 15, 1961

2,996,342
PISTON HEAD STRUCTURE
Rudolph Daub, West Caldwell, N.J.
(9 Hickory Drive, North Caldwell, N.J.)
Filed Feb. 18, 1957, Ser. No. 640,792
15 Claims. (Cl. 309—14)

This invention relates to pistons for internal combustion engines.

An object of this invention is to provide an internal combustion engine piston with piston ring grooves having reinforced surfaces for increasing the resistance to wear and deformation.

Another object of this invention is to provide a piston with piston ring groove surfaces having a wear-resistant member forming a part of said surfaces extending circumferentially around said piston and securely locked in place.

Other objects of this invention will become apparent from the specification taken in connection with the drawings in which, FIGS. 1 and 2 illustrate the metal inserts prior to the molding of the piston;

FIG. 3 illustrates a fragmentary view of two metal inserts positioned together for placement in the mold;

FIG. 4 illustrates a section view of the molded piston prior to machining, taken along lines 4—4 of FIG. 1;

FIG. 5 illustrates a sectional view of the machined piston, taken along lines 5—5 of the metal insert in FIG. 1;

FIG. 6 illustrates a sectional view of the machined piston, taken along lines 6—6 of the metal insert in FIG. 1; and FIG. 7 illustrates a sectional view taken along lines 7—7 of FIG. 6.

Referring to FIG. 5, a cast piston 10, preferably made from aluminum or aluminum alloy metal, is shown with the top surface 11 and cylindrical side surface 12 and with a piston ring groove 13 extending radially inward having upper and lower piston ring groove surfaces 14 and 15, respectively, and an inner annular surface 16. In the piston 10 are metal plates 17 and 18 forming inserts with hard, wear-resistant surfaces in the upper and lower piston ring groove surfaces. The plates 17 and 18 are identical and are stamped from sheet metal to form a ring shape with inner circumferentially spaced openings through the plates having crescent shaped surfaces inclined to the plane of the plates.

In FIG. 1 plate 17 is illustrated with apertures 19 having radial sides or edges 21 and 22 extending parallel and connecting each aperture to the inner opening surrounded by the ring. The wall or edge 23 of each aperture is curved to provide a gradually changing surface. The inclined or beveled surface 24 is stamped in the metal at the time of the formation of the ring and forms a circular edge with the surface 25 of the plate.

The surface 24 extends radially inwardly to be positioned between the center of the plate and the apertures 19 forming surfaces 24a and 24b. The apertures 19 are spaced by portions 27 of the ring which extend radially inwardly and flare radially outwardly on the surface 25 to join the peripheral surface 20.

The plate 18 is similarly formed with apertures 28, parallel edges 29 and 30 on each side to connect the aperture with the inner opening, a peripheral wear-resistant surface 31, and radially extending wear surfaces 32 between the apertures 28. The beveled edge or surface 33 of the aperture is similarly shaped with outwardly facing portions 34, 35.

Preferably two plates or rings are used to reinforce the upper and lower wear surfaces of the piston ring groove and are positioned face to face prior to insertion in the mold, as indicated in FIG. 3.

The rings are fastened together with the apertures aligned and the beveled edges facing one another. The molten aluminum flows around the rings and between the edges 21, 22 and 29, 30 filling the apertures in intimate and continuous contact with the inclined surfaces to form dovetail portions 37, 38, as illustrated in FIGS. 4 and 5.

The piston 10 is machined to remove the excess peripheral portions 39, 40, forming surface 12. The piston ring groove 13 is formed with upper and lower surfaces 14 and 15 and an annular surface 16. The groove is cut to a depth as indicated in FIGS. 4 and 6 and in FIGS. 1, 2 and 3 by the dotted lines B.

The dovetail portions of the piston are partially removed to form the piston ring groove surfaces 14 and 15 with the wear-resistant surfaces 20, 25 and 31, 32, respectively. Thus, the piston ring groove surfaces 14 and 15 each have a continuous wear-resistant surface extending around the piston and inwardly extending wear-resistant surfaces. The dovetail portions form surfaces 41, 42 between the surfaces 32 to form a continuous surface therewith.

The beveled edges overlap with the dovetail portions of the piston and face the piston ring groove so that the wedge-shaped portion of the dovetail is between the piston ring groove and the beveled surface. Thus, the ring or plate is securely locked axially and this lock is firmly maintained by the pounding of the ring against the surfaces. The rings are radially locked by the surfaces 24a, 24b of ring 17 and 34, 35 of the ring 18 engaging the dovetail portions 37, 38 respectively. Thus, the rings are securely locked radially and axially. The pounding of the ring maintains both the axial and the radial lock.

The annular wall 16 also has circumferentially spaced wear-resistant surfaces 48, 49 between the surfaces 50 of the aluminum alloy piston. Thus, a continuous ring is locked both axially and radially in place. In FIG. 2 instead of having a continuous edge for supporting the ring in the mold, circumferentially spaced lugs 51 may be used.

Various modifications may be made in this invention without departing from the invention as set forth in the appended claims.

I claim:

1. A piston structure comprising a cylindrical piston head of aluminum material, a piston ring groove in said head having radially extending upper and lower piston ring groove surfaces, an insert made of a metal harder than the aluminum material embedded in said head and extending in a plane normal to the axis of the piston, said insert having a ring portion extending around in the outer margin of a piston ring surface to form a continuous outer wear resistant surface and edge, said surface having a width less than half the depth of the groove, radial portions extending radially inward in the plane of said ring portion a distance greater than the depth of the groove to form wear resistant surfaces in said piston ring groove surface extending radially inward from said ring wear resistant surface, said radial portions being circumferentially spaced and having circumferentially spaced inner ends, circumferentially extending inner surfaces on said ring portion between said radial portions at an angle to the piston ring groove surface and facing said piston ring groove, projections of aluminum material extending radially between said radial members a distance greater than one-half the radial depth of the groove, said projections each extending at the outer end between a respective circumferentially extending inner surface and said piston ring groove to form wedge-shaped portions each with a surface in said piston ring groove surface to axially lock said ring portion in said head and provide a heat conductive path between a contacting piston ring and the piston ring groove surface having said insert.

2. A piston structure as set forth in claim 1 wherein radial locking means are provided in the inner ends of said radial portions to radially hold said insert in said piston head.

3. A piston structure as set forth in claim 1 wherein the portions of said radial portions within said piston ring groove have a width greater than one-half the width of the piston ring groove.

4. A piston structure as set forth in claim 1 wherein said radial portions have side surfaces at an angle and facing said piston ring groove and said projections have wedge-shaped portions axially locking said radial portion in place.

5. A piston structure as set forth in claim 1 wherein upper and lower inserts are provided with the inner portions of the radial portions each having a width greater than one-half the width of the groove and in contact along facing surfaces.

6. A piston structure comprising a cylindrical piston head of aluminum material, a piston ring groove in said head having radially extending upper and lower piston ring groove surfaces, an insert made of metal harder than the aluminum material and embedded in said head in a plane normal to the axis of the piston, said insert having a plurality of circumferentially spaced reinforcing portions extending radially inward from the outer edge of a piston ring groove a distance greater than the depth of the groove to form radial wear resistant surfaces extending the full depth of the groove, said spaced reinforcing portions having inner ends circumferentially spaced and projections of said piston head extending radially between said spaced reinforcing portions a distance greater than one-half the depth of the groove, and circumferentially extending connecting portions between said spaced reinforcing portions having a width less than one-half the depth of the groove to form a continuous outer wear resistant surface and edge with said spaced reinforcing portions and each connecting portion having an inner surface at an angle facing said piston ring groove and said projection having a wedge-shaped portion axially locking said insert in said piston head.

7. A piston structure as set forth in claim 6 wherein said spaced reinforcing portions have curved side surfaces merging with the inner surface of said connecting portion.

8. A piston structure as set forth in claim 7 wherein said side surfaces are at an angle to said piston ring groove surface and facing said piston ring groove and said projections have wedge-shaped portions positioned between said side surfaces and said piston ring groove to axially lock said spaced reinforcing portion on said piston head.

9. A piston structure as set forth in claim 8 wherein said side surfaces diverge at the inner ends to form radial locking means with said projections.

10. A piston structure as set forth in claim 6 wherein said spaced reinforcing portions have radial locking means at the inner ends.

11. A piston structure comprising a cylindrical piston head of aluminum material, a piston ring groove in said head having a radially extending piston ring groove surface, an insert made of a metal harder than the aluminum material embedded in said head and extending in a plane normal to the axis of the piston, said insert having a ring portion extending around the outer margin of said piston ring groove surface to form a continuous outer wear resistant surface and edge and having circumferentially spaced radial portions forming wear resistant surfaces in said piston ring groove surface, said ring portion having between said radial portions circumferentially extending inner surfaces at an angle to said piston ring groove surface and facing said piston ring groove, projections of aluminum material extending between said radial portions, said radial portions having a radial length at least twice the width of the ring portion to extend the radial portions radially inward a distance greater than the depth of the piston ring groove to radially lock the insert in said head and said ring portion having a radial width less than the radial depth of the piston ring groove, said projections extending to overlap said circumferentially extending inner surfaces and to form circumferentially spaced surfaces of aluminum material in said piston ring groove surface to axially lock said ring portion in the head and conduct heat between a contacting piston ring and the piston ring groove surface having said insert.

12. A piston structure as set forth in claim 11 wherein said piston ring groove has a second radially extending piston ring surface facing said first piston ring groove surface and has a second insert identical to said first insert and embedded in said head, said second insert having a second ring portion extending around the outer margin of said second piston ring groove surface to form a second continuous outer wear resistant surface and edge and having circumferentially spaced radial portions forming wear resistant surfaces in said second piston ring groove surface, said second ring portion having between said second radial portions circumferentially extending inner surfaces at an angle to said second piston ring groove surface and facing said piston ring groove, second projections of aluminum material extending between said second radial portions, said second radial portions having a radial length at least twice the width of the second ring portion to extend the radial portions radially inward a distance greater than the depth of the piston ring groove to radially lock the second insert in said head and said second ring portion having a radial width less than the radial depth of the piston ring groove, said first and second radial portions radially within said piston ring groove each having a thickness greater than one-half the axial width of the piston ring groove and contacting one another, said second projections extending to overlap said circumferentially extending inner surfaces and to form circumferentially spaced surfaces of aluminum material in said piston ring groove surface to axially lock said second ring portion in the head and conduct heat between a piston ring and the second piston ring groove surface.

13. A piston structure as set forth in claim 11 wherein said piston ring groove has an inner axially extending surface and said radial portions radially within said surface having a thickness greater than one-half the axial width of said piston ring groove.

14. A piston structure comprising a cylindrical piston head of aluminum material, a piston ring groove in said head having radially extending upper and lower piston ring groove surfaces, an insert made of a metal harder than the aluminum material embedded in said head and extending in a plane normal to the axis of the piston, said insert having a ring portion extending around in the outer margin of a piston ring surface to form a continuous outer wear resistant surface and edge, said surface having a width less than half the depth of the groove, radial portions extending radially inward in the plane of said ring portion a distance greater than the depth of the groove to form wear resistant surfaces in said piston ring groove surface extending radially inward from said ring wear resistant surface, said radial portions being circumferentially spaced and having circumferentially spaced inner ends, said inner ends formed with surfaces facing outwardly to radially lock said insert in said head, circumferentially extending inner surfaces on said ring portion between said radial portions at an angle to the piston ring groove surface and facing said piston ring groove, projections of aluminum material extending radially between said radial members a distance greater than one-half the radial depth of the groove, said projections each extending at the outer end between a respective circumferentially extending inner surface and said piston ring groove to form wedge-shaped portions each with a surface in said piston ring groove surface to axially lock said ring portion in said head and provide a heat conductive path between a contacting piston ring and the piston ring groove surface having said insert.

15. A piston structure comprising a cylindrical piston head of aluminum material, a piston ring groove in said head having a radially extending piston ring groove surface, an insert made of a metal harder than the aluminum material embedded in said head and extending in a plane normal to the axis of the piston, said insert having a ring portion extending around the outer margin of said piston ring groove surface to form a continuous outer wear resistant surface and edge and having circumferentially spaced radial portions forming wear resistant surfaces in said piston ring groove surface, said ring portion having between said radial portions circumferentially extending inner surfaces at an angle to said piston ring groove surface and facing said piston ring groove, projections of aluminum material extending between said radial portions, said radial portions having a radial length at least twice the width of the ring portion to extend the radial portions radially inward a distance greater than the depth of the piston ring groove to form circumferentially spaced inner ends, said inner ends formed with surfaces facing outwardly to radially lock the insert in said head and said ring portion having a radial width less than the radial depth of the piston ring groove, said projections extending to overlap said circumferentially extending inner surfaces and to form circumferentially spaced surfaces of aluminum material in said piston ring groove surface to axially lock said ring portion in the head and conduct heat between a contacting piston ring and the piston ring groove surface having said insert.

References Cited in the file of this patent

UNITED STATES PATENTS

| | | |
|---|---|---|
| 2,771,328 | Wainwright et al. | Nov. 20, 1956 |
| 2,809,079 | Daub | Oct. 8, 1957 |